US010764305B2

(12) United States Patent
Parker et al.

(10) Patent No.: US 10,764,305 B2
(45) Date of Patent: Sep. 1, 2020

(54) ACCOUNT VERIFICATION SYSTEM

(71) Applicant: Screening Room Media, Inc., West Hollywood, CA (US)

(72) Inventors: Sean Parker, West Hollywood, CA (US); Prem Akkaraju, Los Angeles, CA (US)

(73) Assignee: SCREENING ROOM MEDIA, INC., West Hollywood, CA (US)

( * ) Notice: Subject to any disclaimer, the term of this patent is extended or adjusted under 35 U.S.C. 154(b) by 277 days.

(21) Appl. No.: 15/856,898

(22) Filed: Dec. 28, 2017

(65) Prior Publication Data

US 2019/0207949 A1    Jul. 4, 2019

(51) Int. Cl.
*H04L 29/06* (2006.01)
*G06Q 20/32* (2012.01)
(Continued)

(52) U.S. Cl.
CPC .............. *H04L 63/12* (2013.01); *G06F 21/10* (2013.01); *G06F 21/16* (2013.01); *G06F 21/32* (2013.01); *G06F 21/36* (2013.01); *G06F 21/42* (2013.01); *G06F 21/6218* (2013.01); *G06Q 20/3274* (2013.01); *G06Q 20/3276* (2013.01);
(Continued)

(58) Field of Classification Search
CPC ..... H04L 63/12; H04L 63/0838; H04L 63/08; H04L 63/0861; H04L 9/3228; H04L 67/306; H04L 67/22; H04W 12/06; G06Q 20/3274; G06Q 20/3276; G06F 21/16; G06F 21/42; G06F 21/6218; G06F 21/32;
(Continued)

(56) References Cited

U.S. PATENT DOCUMENTS 9,237,146 B1 *   1/2016   Casillas ................. H04L 63/08
2008/0130058 A1 * 6/2008   Cheng ..................... G06F 21/10
                                                                        358/3.28
(Continued)

FOREIGN PATENT DOCUMENTS

WO    WO-2019133758 A1    7/2019

OTHER PUBLICATIONS

"International Application Serial No. PCT/US2018/067752, International Search Report dated Apr. 8, 2019", 4 pgs.
(Continued)

*Primary Examiner* — Chau Le
*Assistant Examiner* — Han Yang
(74) *Attorney, Agent, or Firm* — Schwegman Lundberg & Woessner, P.A.

(57) ABSTRACT

A digital content delivery system transmits, to a client device, a request for a set of verification data as part of an account registrations process to verify that a user of the client device is providing accurate information regarding their identity. The digital content delivery system receives a subset of the verification data and determines that the user has provided sufficient verification data to verify that the user of the client device is providing accurate information regarding their identity. In response, the digital content delivery system generates a unique identifier for the user account, which enables the user to access digital content maintained by the digital content delivery system. The digital content is provided to the user embedded with the unique identifier for the user account.

20 Claims, 7 Drawing Sheets

(51) Int. Cl.

| | | |
|---|---|---|
| *G06F 21/36* | (2013.01) | |
| *G06F 21/10* | (2013.01) | |
| *G06F 21/32* | (2013.01) | |
| *G06F 21/62* | (2013.01) | |
| *H04W 12/06* | (2009.01) | |
| *G06F 21/42* | (2013.01) | |
| *H04L 9/32* | (2006.01) | |
| *G06F 21/16* | (2013.01) | |
| *H04L 29/08* | (2006.01) | |

(52) U.S. Cl.
CPC ............ *H04L 9/3228* (2013.01); *H04L 63/08* (2013.01); *H04L 63/0838* (2013.01); *H04L 63/0861* (2013.01); *H04L 67/22* (2013.01); *H04L 67/306* (2013.01); *H04W 12/06* (2013.01); *G06F 2221/2117* (2013.01)

(58) Field of Classification Search
CPC ... G06F 21/10; G06F 21/36; G06F 2221/2117
See application file for complete search history.

(56) References Cited

U.S. PATENT DOCUMENTS

| | | | |
|---|---|---|---|
| 2008/0172747 A1* | 7/2008 | Hurtado | G06Q 20/3829 726/26 |
| 2016/0337334 A1* | 11/2016 | Murr | H04W 12/06 |
| 2017/0124302 A1 | 5/2017 | Baldwin et al. | |
| 2017/0126675 A1* | 5/2017 | Yin | H04L 63/0876 |

OTHER PUBLICATIONS

"International Application Serial No. PCT/US2018/067752, Written Opinion dated Apr. 8, 2019", 6 pgs.

* cited by examiner

ACCOUNT VERIFICATION SYSTEM

BACKGROUND

With the advent of digital data and the Internet, digital content can be shared quickly and easily to users in almost any geographic location. For example, digital content posted publicly to websites is accessible to any user with a computer and an internet connection. Although sharing digital content, particularly digital content that is intended to be accessed with no restrictions, has become much easier, the threat of unauthorized access and/or use of digital content that is intended to be restricted has increased. For example, some digital content is intended to be accessed and/or used under specified restricted conditions, such as confidential content, sensitive content, licensed content, etc.

Protecting against unauthorized access to digital content is particularly important when dealing with high value digital content, such as new release movies, social security numbers (SSN), etc. Even one instance of unauthorized access to this type of high value digital content can have a devastating effect on the owner of the content. For example, once a user's SSN has been compromised once, it can be used or shared with others to steal the user's identity. Similarly, once a new release movie has been illegally copied, the movie can be easily distributed across the internet. Current systems do not provide adequate security to protect these types of high value digital content. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
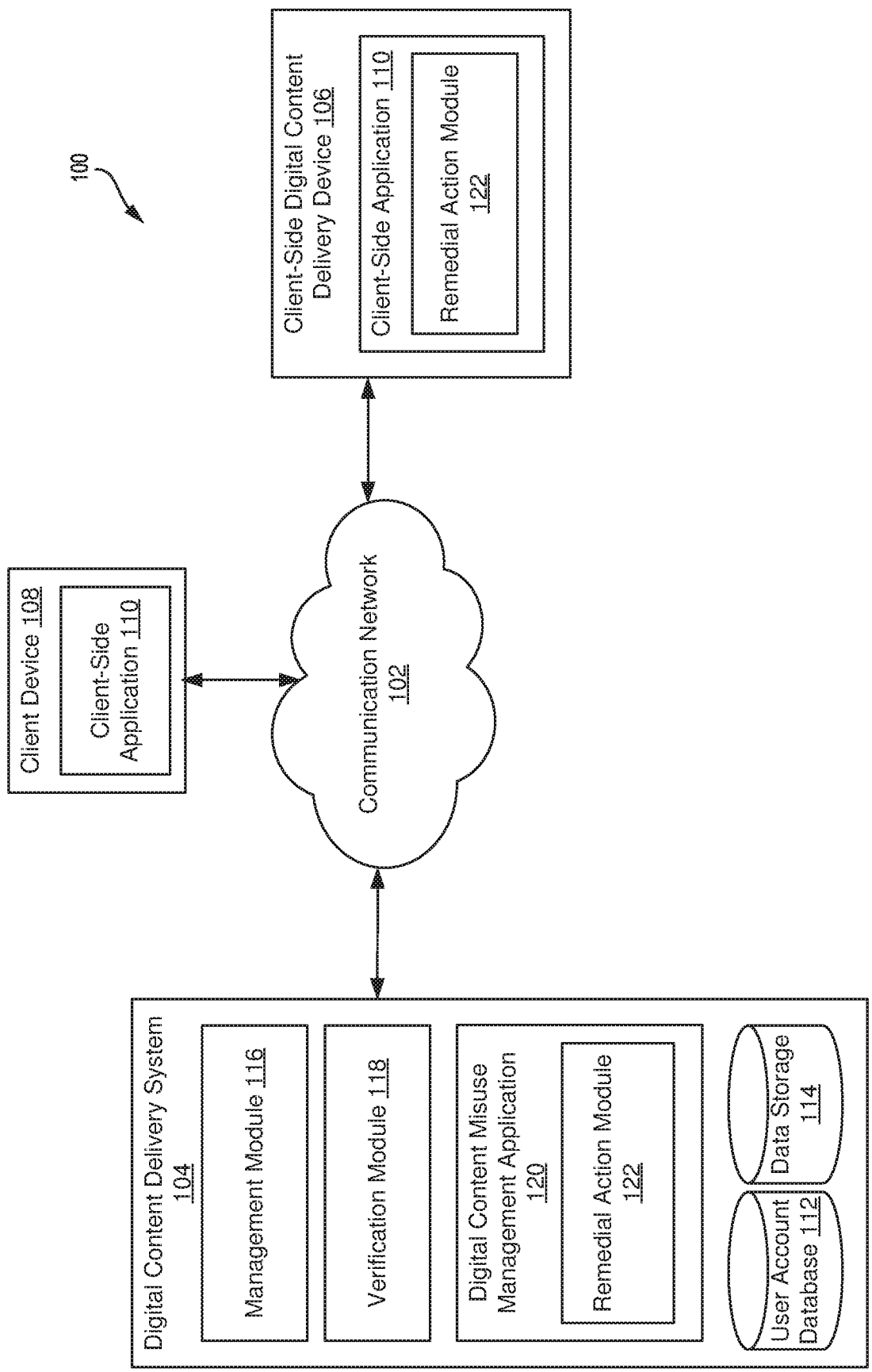
FIG. 1 is a schematic diagram of a digital content distribution network, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT-SIDE DIGITAL CONTENT DELIVERY DEVICE" in this context refers to any machine that interfaces to a communication network to obtain resources from one or more server systems or other computing device. A client-side digital content delivery device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"DIGITAL CONTENT DELIVERY SYSTEM OR DIGITAL CONTENT DISTRIBUTION NETWORK" in this context refers to a system of distributed servers (e.g. networked proxy server) that deliver digital content to a user.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC).

A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on a physical processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multicore processor having two or more independent processors (sometimes referred to as "cores") that may execute instructions contemporaneously.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SCREENING ROOM MEDIA, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

DRAWINGS

The current application discloses a number of technologies that may be used, in example embodiments, to address and mitigate challenges with enforcing access and/or usage restrictions on digital content. These technologies verify the identity of a user that is attempting to register an account with a digital content delivery system to access digital content maintained by the digital content delivery system. To verify the identity of the user, the digital content delivery system requests a set of verification data from the user. The verification data includes a variety of information such as date of birth, finger prints, eye color, height, weight, hair color, name, SSN, driver's license number, bank account information, credit card information, social network information, physical address, email address, phone number, picture, etc.

To reduce the amount of data transmitted between devices, a user initially provide a subset of the requested verification data. The digital content delivery system determines whether the provided subset of requested verification data is sufficient to verify the identity of the user and, if not, requests additional verification data from the user. This reduces the amount of data transmitted between devices, thereby reducing associated computing latency.

Once a user has been successfully registered, the digital content delivery system generates a user account for the user and assigns a unique identifier to the user account. The user then uses the generated user account to access digital content provided by the digital content delivery system. To protect against unauthorized use of the digital content, the digital content delivery system embeds the digital content with the unique identifier assigned to the user's account. If an unauthorized copy of the digital content is later found or detected, the embedded unique identifier is used to identify the violating user account and a remedial action is taken in relation to the user account. For example, the user account can be terminated, suspended, etc.

As an additional level of security, the digital content delivery system uses multi-factor authentication each time a user attempts to perform specified actions, such as accessing digital content. As part of the multi-factor authentication, the digital content delivery system queries the user for two or more pieces of verification data. The digital content delivery system selects which pieces of verification data to request from the user based on one or more factors, such as the subset of verification data provided by the user during registration, the location of the user, etc.

The digital content delivery system further uses the verification data to continuously monitor the user's account for suspicious activity. For example, if the verification data indicates that a user has no children and the user is renting children's movies, the digital content delivery system may determine that the user is possibly misusing the digital content. As another example, if the verification data indicates that the user has no family in known high risk region (e.g., Russia) and the user is determined to be communicating with the high risk region, the digital content delivery system may determine that the user is possibly misusing the digital content.

FIG. 1 is a schematic diagram of a digital content distribution network, according to some example embodiments. It shall be appreciated that although the various functional components of the network 100 are discussed in a singular sense, multiple instances of one or more of the various functional components may be employed.

The network 100 includes multiple computing devices connected to a communication network 102 and configured to communicate with each other through use of the communication network 102. A computing device is any type of general computing device capable of network communication with other computing devices. For example, a computing device includes a personal computing device such as a desktop or workstation, a business server, or a portable computing device, such as a laptop, smart phone, or a tablet PC. A computing device includes some or all of the features, components, and peripherals of the machine 700 described in FIG. 7.

To facilitate communication with other computing devices, a computing device includes a communication interface configured to receive a communication, such as a request, data, etc., from another computing device in network communication with the computing device and pass the communication along to an appropriate module running on the computing device. The communication interface is also be configured to send a communication to another computing device in network communication with the computing device.

As shown, the network 100 includes a digital content delivery system 104, a client-side digital content delivery device 106, and a client device 108 that are configured to provide digital content to users, as well as to enforce access and/or usage restrictions on the digital content. Digital content includes any type of digital content or data, such as text files, video files, music files, etc. Digital content can be associated with one or more intended restrictions on access and/or use of the digital content. For example, digital content includes confidential data and/or sensitive data, such as personal information (e.g., SSN), financial information (e.g., bank records, account numbers, etc.), medical records, confidential work materials, etc., that are restricted for use by specified people. Digital content also includes licensed content, such as movie rentals, movie purchases, music rentals, etc., that are restricted for use to a specified person or audience, during specified times, etc.

Restrictions includes any type of restriction regarding accessing and/or using the digital content, such as a specified user or specified set of users that are authorized to access and/or use the digital content, a specified time period during which the digital content can be accessed and/or used, a specified geographic location where the digital content can be accessed and/or used, restrictions on how the digital content can be accessed and/or used, restrictions on whether the digital content can be copied and/or shared, etc.

In the network 100, the digital content delivery system 104 and client-side digital content delivery device 106 work together to provide users with access to digital content, as well as to enforce access and/or usage restrictions on the digital content. For example, the digital content delivery system 104 and the client-side digital content delivery device 106 monitor one or more usage signals to ensure that digital content is not being misused (e.g., that restrictions associated with the digital content are not being violated). In the event that digital content is being misused, or is potentially being misused, the digital content delivery system 104 and/or the client-side digital content delivery device 106 execute one or more remedial actions, such as suspending or terminating a user's access to the digital content, gathering additional data, investigating use of the digital content, etc.

In the network 100, a user interacts with the digital content delivery system 104 through use of the client device 108 and/or the client-side digital content delivery device 106 connected to communication network 102 by direct and/or indirect communication. The digital content delivery system 104 includes computing devices configured to work with the client-side digital content delivery device 106 and the client device 108 to provide users with digital content, as well as to enforce access and/or usage restrictions on the digital content. The digital content delivery system 104 supports connections from a variety of different types of client-side digital content delivery devices 106 and client device 108, such as desktop computers; mobile computers; mobile communications devices (e.g. mobile phones, smart phones, tablets, etc.); smart televisions; set-top boxes; and/or any other network-enabled computing devices. The client-side digital content delivery device 106 and the client device 108 can be of varying type, capabilities, operating systems, etc. Furthermore, the digital content delivery system 104 concurrently accepts connections from and interacts with multiple client-side digital content delivery devices 106 and client devices 108.

A user interacts with the digital content delivery system 104 via a client-side application 110 installed on the client-side digital content delivery device 106 and the client device 108. In some embodiments, the client-side application 110 includes a digital content delivery system-specific component. For example, the component can be a stand-alone application, one or more application plug-ins, and/or a browser extension. The client-side application 110 presents a user interface (UI) for the user to interact with the digital content delivery system 104. For example, the UI provides the user with digital content as well as include one or more user interface elements (e.g., buttons, text fields, etc.) to enable a user to interact with digital content delivery system 104.

Additionally, the client-side application 110 presents a user with digital content. The client-side application 110 can use output devices (e.g., display, speaker, etc.) of the client-side digital content delivery device 106, client device 108 and/or a secondary computing device (not shown) coupled to the client-side digital content delivery device 106 and/or client device 108 to present digital content received from the digital content delivery system 104. For example, where the client-side digital content delivery device 106 or client device 108 is a mobile phone, the client-side application 110 causes presentation of digital content using a display and/or speaker of the mobile phone. As another example, where the client-side digital content delivery device 106 is a set-top box, the client-side application 110 causes presentation of digital content on a display of a viewing device (e.g., television, monitor, etc.) that is connected to the set-top box.

The digital content delivery system 104 manages digital content for multiple user accounts. For example, the digital content delivery system 104 allows users to store, access, rent and/or purchase digital content.

To facilitate the various services provided by the digital content delivery system 104, a user creates a user account with the digital content delivery system 104. The account information for each created user account is maintained in the user account database 112. The user account database 112 stores profile information for each user account, including a unique account identifier identifying the user account, personal information, username, password, email address, home address, credit card information, banking information, etc. The user account database 112 also includes account management information, such as data storage locations, security settings, personal configuration settings, device identifier for the client-side digital content delivery devices 106 that are authorized to access the user account, etc.

A user account is associated with the subscription, purchase, rental, management and storage of digital content, such as digital data, documents, text files, audio files, video files, etc. For example, the digital content delivery system 104 provides an online retailer interface where users purchase/rent digital content, such as movies, shows, books, music, etc.

Upon digital content being accessed (through an associated subscription, purchase, rental, management or storage operation) by a user, the user's account is updated to indicate that the user has acquired a license to the authorized digital content. This allows the user to access the digital content using the client-side digital content delivery devices 106 and/or the client device 108. For example, a digital content identifier identifying rented and/or purchased digital content (e.g., movie) is assigned to a user account in the user account database 112 and associated with the corresponding user account. The digital content identifier can be used to identify the digital content as well as the location of the digital content.

Further, the user's account is updated with data defining restrictions associated with the digital content, such users authorized to access or use the digital content, geographic locations where the digital content can be accessed, times during which the digital content can be accessed, etc. The restrictions can be based on a license acquired by the user with respect to the digital content. For example, a user may have purchased a limited rental of a movie that entitles the user to view the movie a limited number of times, during a limited time period and/or with a limited number of other users.

Digital content is stored in the data storage 114. The data storage 114 is a storage device, multiple storage devices, or a server. Alternatively, the data storage 114 may be a cloud storage provider or network storage accessible via one or more communication networks. The digital content delivery system 104 hides the complexity and details regarding storage of digital content from the client-side digital content delivery device 106 such that the physical location of digital content stored by the digital content delivery system 104 is not a prerequisite for the operation of the client-side digital content delivery device 106. The digital content delivery system 104 stores the digital content in a network attached storage (NAS) device, a storage area network (SAN), in a redundant array of inexpensive disks (RAID), etc. The data storage 114 stores digital content using one or more physical deployments, partitions and filesystems, such as FAT, FAT32, NTFS, EXT2, EXT3, EXT4, ZFS, ReiserFS, BTRFS, and so forth.

The data storage 114 also stores metadata describing digital content, digital content types, and the relationship of digital content to various user accounts. The metadata can be stored as part of the digital content or can be stored separately. In one variation, digital content stored in the data storage 114 is assigned a system-wide unique identifier. In some embodiments, the metadata includes restrictions associated with the digital content.

The digital content delivery system 104 includes a management module 116 configured to manage and access each user account and the digital content assigned to the user accounts. For example, the management module 116 communicates with the user account database 112 and the data storage 114 to adjust privileges and otherwise manage access to digital content.

Upon a user logging into their user account from a client-side digital content delivery device 106 and/or a client device 108, the management module 116 accesses the account information associated with the user account to identify digital content assigned to the user account, as well as any corresponding restrictions placed on the digital content. The management module 116 enables a user to access and/or use the digital content assigned to their user's account. For example, the management module 116 accesses the user's account to identify digital content identifiers assigned to the user account. The management module 116 uses the digital content identifiers to identify and locate the digital content assigned to the user's account, which are presented according to the account configuration data.

The management module 116 also updates the user's profile to update the user's usage history. Each user's profile includes a usage history indicating the digital content that the user has accessed and/or used, as well as metadata describing each use. This includes the times at which the user accessed and/or used the digital content, as well as any other usage signal data, such as a number of mobile communication and/or computing devices present during usage, geographic location of the user when accessing the digital content, the client-side digital content delivery device 106 used to access the digital content, etc. The management module 116 accesses a user's account and update the user's usage history as the user accesses and/or uses digital content to record each use.

As explained above, in network 100, the digital content delivery system 106 is configured to ensure that digital content is not being misused. To that end, the digital content delivery system 106 initially verifies the identity of a user registering for a user account with the digital content delivery system 106 and, thereafter, perform a multi-step verification process when the user attempts to perform specified actions, such as accessing digital content. As shown, the digital content delivery system 106 includes a verification module 118 that is configured to verify the identity of a user.

To verify the identity of the user, the verification module 118 requests a set of verification data from the user during registration. The verification data includes a variety of information such as date of birth, finger prints, eye color, height, weight, hair color, name, SSN, driver's license number, bank account information, credit card information, social network information, physical address, email address, phone number, picture, etc.

To reduce the amount of data transmitted between devices, a user initially provides a subset of the requested verification data. The verification module 118 determines whether the provided subset of requested verification data is sufficient to verify the identity of the user and, if not, requests additional verification data from the user. This reduces the amount of data transmitted between devices, thereby reducing associated computing latency.

Once a user's account has been successfully registered, the verification module 118 generates a user account for the user in the user account database 112 and assigns a unique identifier to the user account. As explained above, the user can then use the generated user account to access digital content provided by the digital content delivery system 104. The unique identifier assigned to the user's account is used to identify digital content accessed using the user account. For example, the management module 116 embeds digital content that is accessed using the user account with a digital watermark that includes the unique identifier assigned to the user account. The embedded watermark is used to identify the source user account of a digital content item. Once embedded in the digital content, the digital watermark is present in any copies made of the digital content, including unauthorized copies. Hence, if an unauthorized copy of the digital content is found, the digital watermark embedded in the unauthorized copy can be used to identify the source user account.

As an additional level or security, the verification module 118 uses multi-factor authentication each time a user attempts to perform specified actions, such as accessing digital content. As part of the multi-factor authentication, the verification module 118 queries the user for two or more pieces of verification data. The verification module 118 selects which pieces of verification data to request from the user based on one or more factors, such as the subset of verification data provided by the user during registration, the location of the user, etc. The functionality of the verification module 118 is discussed in greater detail in relation to FIG. 2.

In addition to verifying the identity of a user, the digital content delivery system 104 and the client-side digital content delivery device 106 monitor one or more usage signals to ensure that digital content is not being misused and, in the event that digital content is potentially being misused, execute one or more remedial actions. Usage signals can be any type of data gathered with regard to presenting digital content. For example, usage signals include the user's usage history (e.g., digital content accessed, times accessed, etc.), frequency that the user accesses digital content, the number of times the user has accessed a particular item of digital content (e.g., a particular movie, document, etc.), the number of detected users viewing the digital content, location of the user when accessing digital content, configuration changes prior to or while accessing digital content, etc. Usage signals also include data gathered about the user that is not directly related to the user's use of digital content, such as data gathered from the user's social networking sites, phone records gathered from the user's client device 108, etc.

The digital content delivery system 104 and the client-side digital content delivery device 106 each gather and share usage signal data to determine whether digital content is potentially being misused and, in the event that digital content is potentially being misused, execute one or more remedial actions. For example, the digital content delivery system 104 includes a digital content misuse management application 120 that is configured to determine whether digital content is potentially being misused and, in the event that digital content is potentially being misused, execute one or more remedial actions. Likewise, the client-side application 110 can be configured to determine whether digital content is potentially being misused and, in the event that digital content is potentially being misused, execute one or more remedial actions.

The digital content misuse management application 120 uses verification data stored in the user's account to determine whether a user's action may indicate that the user is misusing content. The digital content misuse management application 120 uses the user's verification data to derive the user's preferences for digital content, and then monitors the user's content usage for access to digital content that is opposed to the user's derived preferences. For example, given use verification data indicating that a user has no children, the digital content misuse management application 120 derives that the user's preferences do not include children's movies or that, alternatively, the user's preferences include action, horror, or other types of movies not often watched by children. If the digital content misuse management application 120 detects that the user is accessing children's content on a regular basis, the digital content misuse application 120 determines that the user is likely misusing the digital content (e.g., pirating the content or performing it for audiences).

As another example, the user's verification data may indicate that the user lives in a certain time zone or works during specified hours. The digital content misuse application 120 users this information to derive expected times during which the user is likely to access and also not likely to access to digital content. For example, the digital content misuse application 120 derives that the user is unlikely to access digital content during the hours of 2 am-8 am in the user's local time zone, as well as during the hours the user is expected to be at work. The digital content misuse application 120 then monitors the hours during which the user accessed digital content and determines that the user is likely misusing digital content if the user is regularly accessing digital content during the hours that the user is unlikely to access digital content.

As another example, the user's verification data may indicate geographic areas in which the user lives or has friends or relatives. The digital content misuse application 120 uses this data to derive geographic areas the user is likely to contact as well as geographic areas the user is unlikely to contact. The digital content misuse application 120 monitors geographic user contacts for regular contacts to areas that the user is determined unlikely to contact and/or areas that are designates as being high risk areas where pirated content often originates (e.g., Russia). To determine the geographic areas to which the user is making contact, the client-side application 110 may monitor user usage of the client device 108. In the event that the digital content misuse application 120 determines that the user is making regular contact to geographic areas that the user is unlikely to contact and/or areas that are designates as being high risk areas where pirated content often originates, the digital content misuse application 120 determines that the user is likely misusing digital content. In any case, the digital content misuse application 120 executes a remedial action to stop or minimize the unauthorized access.

A remedial action is one or more actions performed with the intent of stopping misuse of digital content. For example, a remedial action includes terminating performance of digital content, suspending performance of digital content, disabling the client-side digital content delivery device 106, suspending or terminating a user account, gathering additional data to determine whether a suspected misuse of digital content is in fact a misuse of the content, etc.

A remedial action is performed by the digital content delivery system 104 and/or the client-side digital content delivery device 106. As shown, the digital content delivery system 104 includes a remedial action module 122 configure to execute remedial actions. Likewise, the client-side digital content delivery device 106 includes remedial action module 122 configured to execute remedial actions.

A remedial action includes terminating performance of digital content, which can cause the performance of digital content being performed by the client-side digital content delivery device 106 to end. For example, the remedial action module 122 causes the digital content delivery system 104 to stop transmitting (e.g., streaming, downloading, etc.) the digital content to the client-side digital content delivery device 106, thereby terminating performance of the digital content. As another example, the remedial action module 122 transmits a command to the client-side digital content delivery device 106 to stop performing the digital content. As another example, the remedial action module 122 causes the client-side digital content delivery device 106 to terminate performance of the digital content.

A remedial action includes causing the client-side digital content delivery device 106 to suspend performance of digital content. In contrast to terminating performance of digital content, suspending performance includes pausing performance of the digital content. This can be for a specified period of time or until a command is received to resume performance. For example, the digital content delivery system 104 transmits a command to the client-side digital content delivery device 106 to resume performance of the suspended digital content. This can be the result of the digital content delivery system 104 determining that the digital content is not being misused.

A remedial action includes disabling the client-side digital content delivery device 106. Disabling the client-side digital content delivery device 106 causes the client-side digital content delivery device 106 to be inoperable to perform any function by the user.

A remedial action includes gathering additional information to determine whether a suspected misuse of digital content is in fact a misuse. The remedial action module 122 causes social media activity of one or more users associated with the client-side digital content delivery device 106 or user account to be scanned to gather information indicating that the user(s) are misusing digital content. For example, the remedial action module 122 scans a user's social media activity for postings indicating that the user allowed unauthorized access to digital content (e.g., hosting a viewing of a movie for a large audience).

A remedial action includes simply presenting a user with a warning or message indicating that the user is suspected of misusing digital content. Although several examples of remedial actions are given, these are just some examples and are not meant to be limiting.

A remedial action also includes suspending or terminating a user account identified as having been the source of an unauthorized use of digital content. For example, the digital content misuse management application 120 uses the unique identifier embedded in an unauthorized copy of a digital content item to identify the source user account. When a user account is used to access a digital content item from the digital content delivery system 104, the management module 116 embeds the digital content with the unique identifier associated with the user account prior to providing the digital content to the requesting user. For example, the unique identifier is embedded in a digital watermark in the digital content. Once embedded in the digital content, the unique identifier remains in any copies made of the digital content item. Accordingly, the unique identifier in an unauthorized copy of a digital content item is used to identify the source user account. The remedial action module 122 executes a remedial action in relation to the offending user account by suspending or terminating the user account. As a result, the user account, at least temporarily, cannot be used to access additional content from the digital content delivery system 104.

Figure 2:
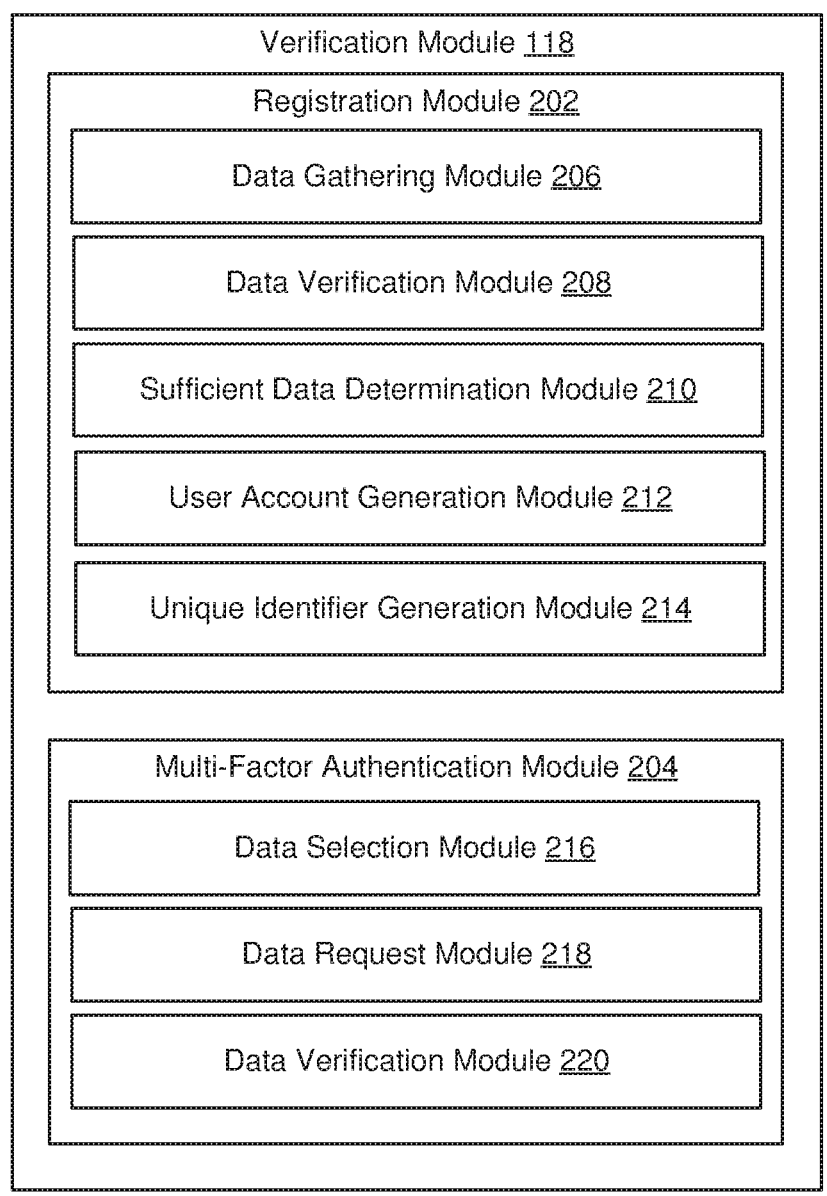
FIG. 2 is a block diagram of a verification module, according to some example embodiments.

FIG. 2 is a block diagram of a verification module 118, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the verification module 118 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the verification module 118 includes a registration module 202 and a multi-factor authentication module 204. The registration module 202 enables a user to register for a user account with the digital content delivery system 104, and verifies that the information provided by the user is accurate. The multi-factor authentication module 204 provides continuing authentication of a user after the user's account has been generated. For example, the multi-factor authentication module 204 requests that the user provide at least two pieces of verification data when the user requests to perform specified actions, such as access digital content from the digital content delivery system 104.

As shown, the authentication module 204 includes a data gathering module 206, a data verification module 208, a sufficient data determination module 210, a user account generation module 212, and a unique identifier generation module 214.

The data gathering module 206 gathers verification data from a user. Verification data includes any type of data associated with or identifying a user. For example, verification data includes static data describing a user such as the user's date of birth, finger prints, eye color, etc. Verification data also includes variable data describing a user such as the user's height, weight, hair color, image of the user's face, etc. Verification data also includes governmental information about a user, such as the user's SSN, driver's license number, etc. Verification data also includes commercial information about a user, such as the user's bank account numbers, credit card information, credit history, etc. Verification data also includes a user's social networking information, such as the user's login information or account information for social networking sites (e.g., Facebook, Twitter, Snapchat, Instagram, etc.). The verification data also includes personal information about a user, such as the user physical address, email address, phone number, etc.

The data gathering module 206 requests this verification data from a user when the user initiates registering a new user account with the digital content delivery system 104. For example, the data gathering module 206 transmits a request to the client device 108 of the user for a set of the verification data. The set of verification data may include all of or any subset of the verification listed above, as well as any other type of verification data.

A user uses their client device 108 to enter and/or otherwise provide any of the requested verification data. For example, the client-side application 110 presents the user with a registration interface that includes user interface elements, such as text boxes, buttons, etc., that enable the user to provide the requested verification data. Further, the user may use input devices of the client device 108 to provide verification data. For example, the user may use the camera or other optical input of the client device 108 to capture images of the user (e.g., user's face), the user's government issued identification cards (e.g., social security card, driver's license, state identification card, etc.), etc. An optical input of the client device 108 may also be used to perform scans of the user or other objects. For example, the optical input may be used to scan the user's face to generate a three-dimensional (3D) face scan of the user, or to perform a retina or fingerprint scan. The optical input may also be used to scan a barcode or other type of optical code (e.g., quick response (QR) code). For example, the optical input may be used to scan a code on the user's credit cards.

Likewise, an audio sensor (e.g., microphone) of the client device 108 may be used to capture audio data from the user. For example, the user may use the audio sensor to submit a sample of their voice, such as the user providing a predetermined statement.

Biometric sensors of the client device 108 may also be used to gather verification data of the user. For example, biometric sensors may be used to capture a user's fingerprint, perform a retinal scan, etc.

The user may initially provide all of the requested verification data or, alternatively, only a subset of the requested verification data. Enabling the user to initially provide a subset of the verification reduces the amount of data transmitted between the client device 108 and the digital content delivery system 104, thereby reducing overall network usage and system latency. As a result, overall performance of the computing devices and or systems is improved.

As another example, the data gathering module 206 initially requests only a subset of the verification data from the user. In this type of embodiment, the data gathering module 206 subsequently requests additional verification data from the user if needed. This is discussed in greater detail below.

The data verification module 208 verifies the authenticity of the verification data received from the user. To accomplish this, the data verification module 208 communicates with third party services and/or servers to authenticate the received verification data. For example, to verify a user's phone number or that the phone number provided by a user is associated with the user's actual phone and not a burner phone, the data verification module 208 communicates with phone service and/or network provider servers to confirm the authenticity of the physical phone and the associated number. Additionally, the data verification module 208 searches known burner phone services based on a provided phone number to further verify that the phone is not associated with a burner phone.

To verify a government issued identification, the data verification module 208 communicates with available government services to validate the identification as well as any related personal information. For example, the data verification module 208 verifies that the address, gender, birth date, eye color, etc., match the records associated with the government issued identification.

To verify credit card information, the data verification module 208 communicates with credit services and utilizes the credit card information provided by the user (e.g., number, CVV, expiration date) to verify the validity of the card. For example, the data verification module 208 verifies that the provided credit card information is valid and that information associated with the credit card (e.g., name, address, etc.) matches the information provided by the user.

The data verification module 208 also uses banking information provided by a user to verify the data provided by the user. For instance, the data verification module 208 uses login credentials provided by a user to communicate with a corresponding online banking service and login to the user's account with the banking service. The data verification module 208 then gathers data from the user's account with the banking service to verify other data provided by the user, such as the user's name, address, etc. As another example, the data verification module 208 may charge the user's credit card account a fee and simultaneously deposit a nearly equal amount of money back to the user's checking account, thereby eliminating the need to gather the user's login credentials for the backing service.

The data verification module 208 also uses the user's social media accounts to verify data provided by the user. For instance, the data verification module 208 accesses the user's public profiles on social media accounts and/or uses the user's login credentials to access the user's social media accounts. The data verification module 208 gathers data from the user's social media accounts (e.g., email, name, address, images, etc.) to verify data provided by the user.

The data verification module 208 also verifies user data by using the user's provided SSN to pull a credit check for the user. For example, the data verification module 208 communicates with servers for one of the available credit agencies to pull the user's credit. The data verification module 208 then uses the data in the user's credit history to verify the other data provided by the user.

The data verification module 208 verifies images of the user from data obtained from one or more of services that maintain images of the user, such as government web services (e.g., the department of motor vehicles) that maintain an image of the user, social media services, etc. Likewise, the data verification module 208 may use similar sources to verify retinal scans and/or biometric data provided by a user.

To further verify the information provided by a user, the data verification module 208 gathers location data from the user's client device 108. The location data indicates a geographic location of the client device 108, and may be gathered using a variety of techniques such as using a Global Positioning System (GPS) component of the client device 108. The verification module 208 uses the received location information to verify address information provided by the user.

In addition to the automated methods performed by the data verification module to verify verification data, a user's verification data may also be verified through use of in-person phone screening. For example, agents may contact registering users and conduct a phone screening with the user to verify and/or clarify any information provided by the user against any verified data gathered from online data sources. As part of the in-person screening process, agents may ask for copies of the user's most recent billing statements (e.g., utility, phone, broadband, etc.) in order to match the user and their location to the verification data previously provided by the user.

The sufficient data determination module 210 determines whether the verification data provided by the user is sufficient to verify the identity of the user. As explained, the user may be initially prompted for or allowed to provide a subset of the verification data. This reduces the amount of data transmitted between devices, thereby reducing system latency and improving overall system performance. The sufficient data determination module 210 determines whether the provided subset of verification data is sufficient to verify a user's identify or if additional verification data should be requested from the user.

The sufficient data determination module 210 may determine whether the provided subset of verification data is sufficient to verify a user's identity in multiple ways. For instance, in some implementations the sufficient data determination module 210 uses predetermined values assigned to each type of verification data to calculate an overall score, which is then compared to a threshold. For example, the sufficient data determination module 210 gathers the predetermined value for each piece of verification data provided by the user that has been verified by the data verification module 208, and adds the values together to generate an overall score. The sufficient data determination module 210 then compares the overall score to a threshold score and determines that the user has provided sufficient verification data when the overall score meets or exceeds the threshold score. Alternatively, the sufficient data determination module 210 determines that the user has not provided sufficient data when the overall score is less than the threshold score. The data gathering module 206 may then prompt the user to provide additional verification data.

As another example, the sufficient data determination module 210 may determine whether the provided subset of verification data is sufficient to verify a user's identity based on predetermined combinations of verification data. For example, the sufficient determination module 210 maintains a listing of sufficient combinations of verification data that the user sufficient data determination module 210 uses to determine whether the user has provided sufficient data. The sufficient data determination module 210 searches the listing of sufficient combinations of verification data to determine which of the verification data provided by the user and verified by the data verification module 208 satisfies any of the listed combinations. If the data provided by the user does satisfy a listed combination, the sufficient data determination module 210 determines that the user has provided sufficient data. Conversely, if the sufficient data determination module 210 determines that none of the listed combinations are satisfied, the sufficient data determination module 210 determines that the user has not provided sufficient verification data and the user may be prompted to provide additional data.

These are only two possible methods that the sufficient data determination module 210 may use to determine whether a user has provided sufficient verification data, and are not meant to be limiting. The sufficient data determination module 210 can use any of a number of methods to determine whether a user has provided sufficient verification data, and this disclosure anticipates all such embodiments.

After the sufficient data determination module 210 determines that the user has provided sufficient verification data to verify that the user of the client device 108 is providing accurate information regarding their identity, the user account generation module 212 generates a user account for a user. This includes updating the user account database 112 to create a new user account as well as updating the user account with the verification data provided by the user, such as the user's name, address, credit card information, etc. The user account generation module 212 also prompts the user to provide a username and password to access their user account. Once the user account is generated by the user account generation module 212, the user can begin using their user account to access the services provided by the digital content delivery system 104, including accessing digital content maintained by the digital content delivery system 104.

The unique identifier generation module 214 generates a unique identifier for the user's account. The unique identifier generation module 214 can use any known technique to generate unique identifiers that result in each user account having a distinct unique identifier. In other words, no two user accounts will share the same unique identifier. The unique identifier generated for a user account is stored in the user account database 112 and associated with its corresponding user account.

The generated unique identifier is used to identify digital content that was accessed using the user account. For example, digital content accessed using the user account is embedded with the unique identifier corresponding to the user account. The unique identifier is embedded through use of a digital watermark. If at a later time an unauthorized copy of the digital content is found (e.g., a pirated copy of a movie), the digital watermark included in the digital content is used to identify the unique identifier and the corresponding user account. As a result, the violating user will be known and remedial actions may be performed, such as suspending or terminating the user's account.

After a user account has been generated, the multi-factor authentication module 204 confirms the user's identity when the user attempts to perform specified actions that may be considered consequential actions. This can include actions such as accessing digital content, making changes to data included in the user's account, purchasing digital content items, renting digital content items, etc. As shown, the multi-factor authentication module 204 includes a data selection module 216, a data request module 218 and a data verification module 220.

The multi-factor authentication module 204 requests at least two items of verification data from a user when the user attempts to perform specified actions. This prevents an attacker from penetrating a single compromised access point. The data selection module 216 determines which items of verification data to request from the user. This determination may be dynamic, meaning that different items of verification data may be requested based on the user account, as well as other contextual data, such as the time of day, verification data provided by the user during registration, geographic location of the user, etc.

In some embodiments, the data selection module 216 selects which authentication data to request from a user based on the authentication data that has been provided by the user. For instance, the data selection module 216 communicates with the user account database and determines which authentication data is available in the user's account and then selects two or more items of authentication data to request from the user. The data selection module 216 may select from the available authentication data at random, or based on other factors. For example, the data selection module 216 selects authentication data based on a predetermined priority order assigned to the authentication data. As a result, the data selection module 216 would select the pieces of authentication data considered to be better indicators for verifying the identity of the user.

In another example, the data selection module 216 selects pieces of authentication data based on categorizations of the authentication data. In this type of embodiments, authentication data is categorized based on the type of data, and the data selection module 216 selects a piece of authentication data from at least two of the categories.

The data selection module 216 may also select pieces of authentication data based on the capabilities of the user's client device 108. For instance, if the user's client device 108 is equipped with a biometric sensor, the data selection module 216 selects that the user provide data captured by the biometric sensor, such as the user's fingerprint, retinal scan, etc. As another example, if the user's client device 108 is equipped with an optical sensor, such as a camera, the data selection module 216 requests that the user provide an image of the user captured by the optical sensor. As another example, if the user's client device 108 is equipped with a GPS component capable of determining the location of the user, the data selection module 216 requests that the user provide location data determined by the GPS component.

These are only examples of how the data selection module 216 may select pieces of authentication data, and they are not meant to be limiting. The data selection module 216 may use any of a variety of techniques to select pieces of authentication data, and this disclosure anticipates all such embodiments.

The data request module 218 transmits a request to the user's client device 108 for the authentication data selected by the data selection module 216. The user then uses their client device 108 to provide the requested authentication data. For example, the user uses a keypad to type in provided information and/or uses sensors and other input components on the device to provide the requested data, such as biometric sensors, camera, etc.

The data verification module 220 verifies the authentication data received from the client device 108. For example, the data verification module 220 communicates with the user account database 112 to gather the verification data associated with the user's account. The data verification module 220 then determines whether the verification data provided by the user matches the verification data stored in the user account database 112. If the provided verification data matches the verification data in the user account database 112, the user is permitted to perform their requested action, such as access digital content. Alternatively, if the provided verification data does not match the verification data in the user account database 112, the user's request to perform the action is denied.

Figure 3:
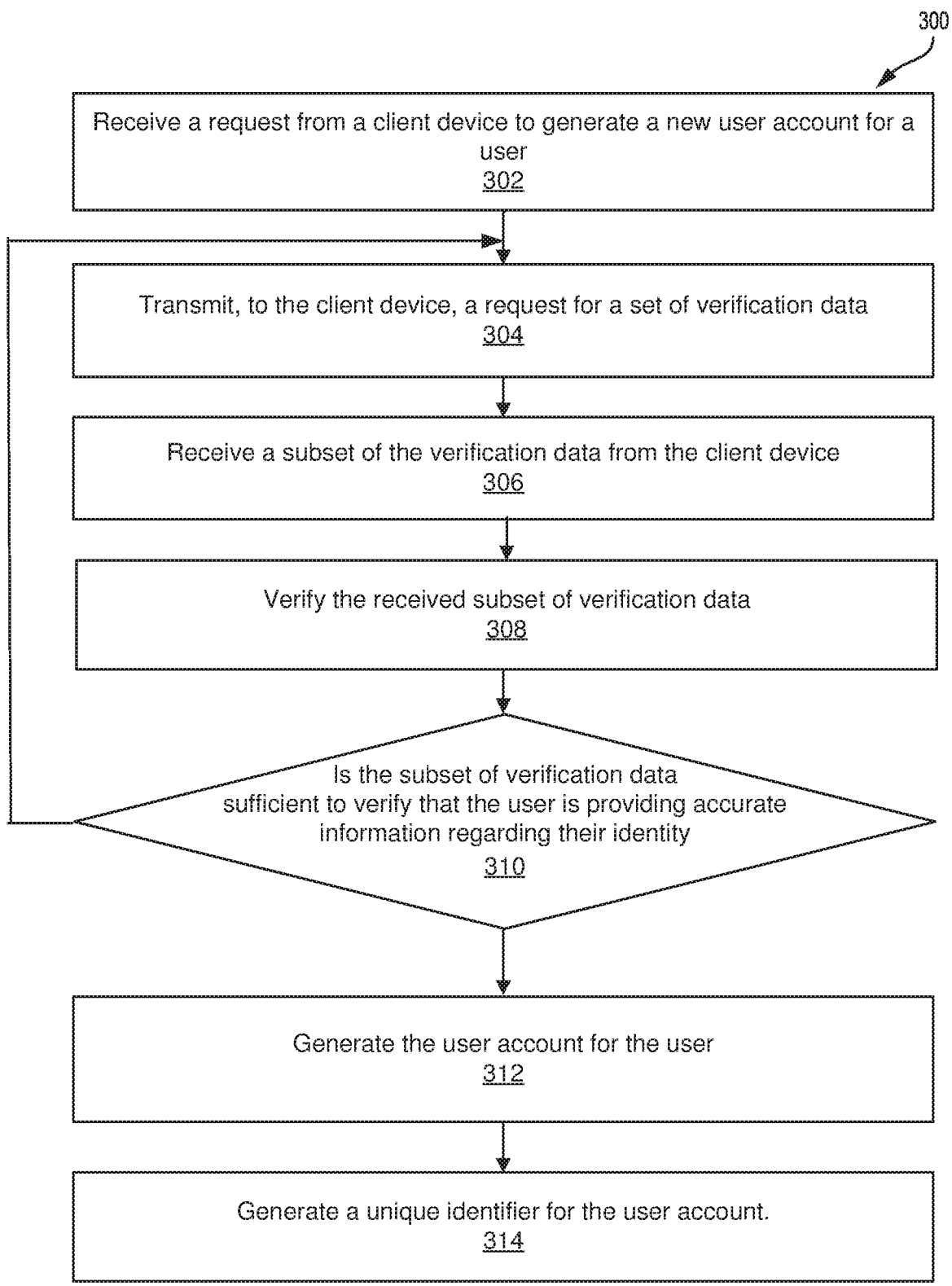
FIG. 3 is a flowchart showing a method of verifying a user's identity during user account registration, according to certain example embodiments.

FIG. 3 is a flowchart showing a method 300 of verifying a user's identity during user account registration, according to certain example embodiments. The method 300 may be embodied in computer readable instructions for execution by one or more processors such that the operations of the method 300 may be performed in part or in whole by the registration module 202; accordingly, the method 300 is described below by way of example with reference thereto. However, it shall be appreciated that at least some of the operations of the method 300 may be deployed on various other hardware configurations and the method 300 is not intended to be limited to the registration module 202.

At operation 302, the digital content delivery system 104 receives a request from a client device 108 to generate a new user account for a user.

At operation 304, the data gathering module 206 transmits, to the client device, a request for a set of verification data. Verification data includes any type of data associated with or identifying a user. For example, verification data includes static data describing a user such as the user's date of birth, finger prints, eye color, etc. Verification data also includes variable data describing a user such as the user's height, weight, hair color, image of the user's face, etc. Verification data also includes governmental information about a user, such as the user's SSN, driver's license number, etc. Verification data also includes commercial information about a user, such as the user's bank account numbers, credit card information, credit history, etc. Verification data also includes a user's social networking information, such as the user's login information or account information for social networking sites (e.g., Facebook, Twitter, Snapchat, Instagram, etc.). The verification data also includes personal information about a user, such as the user's physical address, email address, phone number, etc.

A user uses their client device 108 to enter and/or otherwise provide any of the requested verification data. Accordingly, at operation 306, the data gathering module 206 receives a subset of the verification data from the client device.

For example, the client-side application 110 presents the user with a registration interface that includes user interface elements, such as text boxes, buttons, etc., that enable the user to provide the requested verification data. Further, the user may use input devices of the client device 108 to provide verification data. For example, the user may use the camera or other optical input of the client device 108 to capture images of the user (e.g., user's face), the user's government issued identification cards (e.g., social security card, driver's license, state identification card, etc.), etc. An optical input of the client device 108 may also be used to perform scans of the user or other objects. For example, the optical input may be used to scan the user's face to generate a three-dimensional (3D) face scan of the user, or to perform a retinal or fingerprint scan. The optical input may also be used to scan a barcode or other type of optical code (e.g., quick response (QR) code). For example, the optical input may be used to scan a code on the user's credit cards.

Likewise, an audio sensor (e.g., microphone) of the client device 108 may be used to capture audio data from the user. For example, the user may use the audio sensor to submit a sample of their voice, such as the user providing a predetermined statement.

Biometric sensors of the client device 108 may also be used to gather verification data of the user. For example, biometric sensors may be used to capture a user's fingerprint, perform a retinal scan, etc.

The user may initially provide all of the requested verification data or, alternatively, only a subset of the requested verification data. Enabling the user to initially provide a subset of the verification reduces the amount of data transmitted between the client device 108 and the digital content delivery system 104, thereby reducing overall network usage and system latency. As a result, overall performance of the computing devices and or systems is improved.

As another example, the data gathering module 206 initially requests only a subset of the verification data from the user. In this type of embodiment, the data gathering module 206 subsequently requests additional verification data from the user if needed. This is discussed in greater detail below.

At operation 308, the data verification module 208 verifies the received subset of verification data. To accomplish this, the data verification module 208 communicates with third party services and/or servers to authenticate the received verification data. For example, to verify a user's phone number or that the phone number provided by a user is associated with the user's actual phone and not a burner phone, the data verification module 208 communicates with phone service and/or network provider servers to confirm the authenticity of the physical phone and the associated number. Additionally, the data verification module 208 searches known burner phone services based on a provided phone number to further verify that the phone is not associated with a burner phone.

To verify a government issued identification, the data verification module 208 communicates with available government services to validate the identification as well as any related personal information. For example, the data verification module 208 verifies that the address, gender, birth date, eye color, etc., match the records associated with the government issued identification.

To verify credit card information, the data verification module 208 communicates with credit services and utilizes the credit card information provided by the user (e.g., number, CVS code, expiration date) to verify the validity of the card. For example, the data verification module 208 verifies that the provided credit card information is valid and that information associated with the credit card (e.g., name, address, etc.) matches the information provided by the user.

The data verification module 208 also uses banking information provided by a user to verify the data provided by the user. For instance, the data verification module 208 uses login credentials provided by a user to communicate with a corresponding online banking service and login to the user's account with the banking service. The data verification module 208 then gathers data from the user's account with the banking service to verify other data provided by the user, such as the user's name, address, etc. As another example, the data verification module 208 may charge the user's credit card account a fee and simultaneously deposit a nearly equal amount of money back to the user's checking account, thereby eliminating the need to gather the user's login credentials for the backing service.

The data verification module 208 also uses the user's social media accounts to verify data provided by the user. For instance, the data verification module 208 accesses the user's public profiles on social media accounts and/or uses the user's login credentials to access the user's social media accounts. The data verification module 208 gathers data from the user's social media accounts (e.g., email, name, address, images, etc.) to verify data provided by the user.

The data verification module 208 also verifies user data by using the user's provided SSN to pull a credit check for the user. For example, the data verification module 208 communicates with servers for one of the available credit agencies to pull the user's credit. The data verification module 208 then uses the data in the user's credit history to verify the other data provided by the user.

The data verification module 208 verifies images of the user from data obtained from one or more of services that maintain images of the user, such as government web services (e.g., the department of motor vehicles) that maintain an image of the user, social media services, etc. Likewise, the data verification module 208 may use similar sources to verify retinal scans and/or biometric data provided by a user.

To further verify the information provided by a user, the data verification module 208 gathers location data from the user's client device 108. The location data indicates a geographic location of the client device 108, and may be gathered using a variety of techniques such as using a Global Positioning System (GPS) component of the client device 108. The verification module 208 users the received location information to verify address information provided by the user.

In addition to the automated methods performed by the data verification module to verify verification data, a user's verification data may also be verified through use of in-person phone screening. For example, agents may contact registering users and conduct a phone screening with the user to verify and/or clarify any information provided by the user against any verified data gathered from online data sources. As part of the in-person screening process, agents may ask for copies of the user's most recent billing statements (e.g., utility, phone, broadband, etc.) in order to match the user and their location to the verification data previously provided by the user.

At operation 310, the sufficient data determination module 210 determines whether the subset of verification data is sufficient to verify that the user is providing accurate information regarding their identity. As explained, the user may be initially prompted for or allowed to provide a subset of the verification data. This reduces the amount of data transmitted between devices, thereby reducing system latency and improving overall system performance. The sufficient data determination module 210 determines whether the provided subset of verification data is sufficient to verify a user's identity or if additional verification data should be requested from the user.

The sufficient data determination module 210 may determine whether the provided subset of verification data is sufficient to verify a user's identity in multiple ways. For instance, in some implementations the sufficient data determination module 210 uses predetermined values assigned to each type of verification data to calculate an overall score, which is then compared to a threshold. For example, the sufficient data determination module 210 gathers the predetermined value for each piece of verification data provided by the user that has been verified by the data verification module 208, and adds the values together to generate an overall score. The sufficient data determination module 210 then compares the overall score to a threshold score and determines that the user has provided sufficient verification data when the overall score meets or exceeds the threshold score. Alternatively, the sufficient data determination module 210 determines that the user has not provided sufficient data when the overall score is less than the threshold score. The data gathering module 206 may then prompt the user to provide additional verification data.

As another example, the sufficient data determination module 210 may determine whether the provided subset of verification data is sufficient to verify a user's identity based on predetermined combinations of verification data. For example, the sufficient determination module 210 maintains a listing of sufficient combinations of verification data that the user sufficient data determination module 210 to determine whether the user has provided sufficient data. The sufficient data determination module 210 searches the listing of sufficient combinations of verification data to determine which of the verification data provided by the user and verified by the data verification module 208 satisfies any of the listed combinations. If the data provided by the user does satisfy a listed combination, the sufficient data determination module 210 determines that the user has provided sufficient data. Conversely, if the sufficient data determination module 210 determines that none of the listed combinations are satisfied, the sufficient data determination module 210 determines that the user has not provided sufficient verification data and the user may be prompted to provide additional data.

These are only two possible methods that the sufficient data determination module 210 may use to determine whether a user has provided sufficient verification data, and are not meant to be limiting. The sufficient data determination module 210 can use any of a number of methods to determine whether a user has provided sufficient verification data, and this disclosure anticipates all such embodiments.

If the sufficient data determination module 210 determines that the subset of verification data is not sufficient to verify that the user is providing accurate information, the method return to operation 304, and the user is prompted to provide additional verification data. Alternatively, if the sufficient data determination module 210 determines that the subset of verification data is sufficient to verify that the user is providing accurate information, the method continues to operation 312 where the user account generation module 212 generates the user account for the user. This includes updating the user account database 112 to create a new user account as well as updating the user account with the verification data provided by the user, such as the user's name, address, credit card information, etc. The user account generation module 212 also prompts the user to provide a user name and password to access their user account. Once the user account is generated by the user account generation module 212, the user can begin using their user account to access the services provided by the digital content delivery system 104, including accessing digital content maintained by the digital content delivery system 104.

At operation 314, the unique identifier generation module 214 generates a unique identifier for the user account. The unique identifier generation module 214 can use any known technique to generate unique identifiers that result in each user account having a distinct unique identifier. In other words, no two user accounts will share the same unique identifier. The unique identifier generated for a user account is stored in the user account database 112 and associated with its corresponding user account.

The generated unique identifier is used to identify digital content that was accessed using the user account. For example, digital content accessed using the user account is embedded with the unique identifier corresponding to the user account. The unique identifier is embedded through use of a digital watermark. If at a later time an unauthorized copy of the digital content is found (e.g., a pirated copy of a movie), the digital watermark included in the digital content is used to identify the unique identifier and the corresponding user account. As a result, the violating user will be known and remedial actions may be performed, such as suspending or terminating the user's account.

Figure 4:
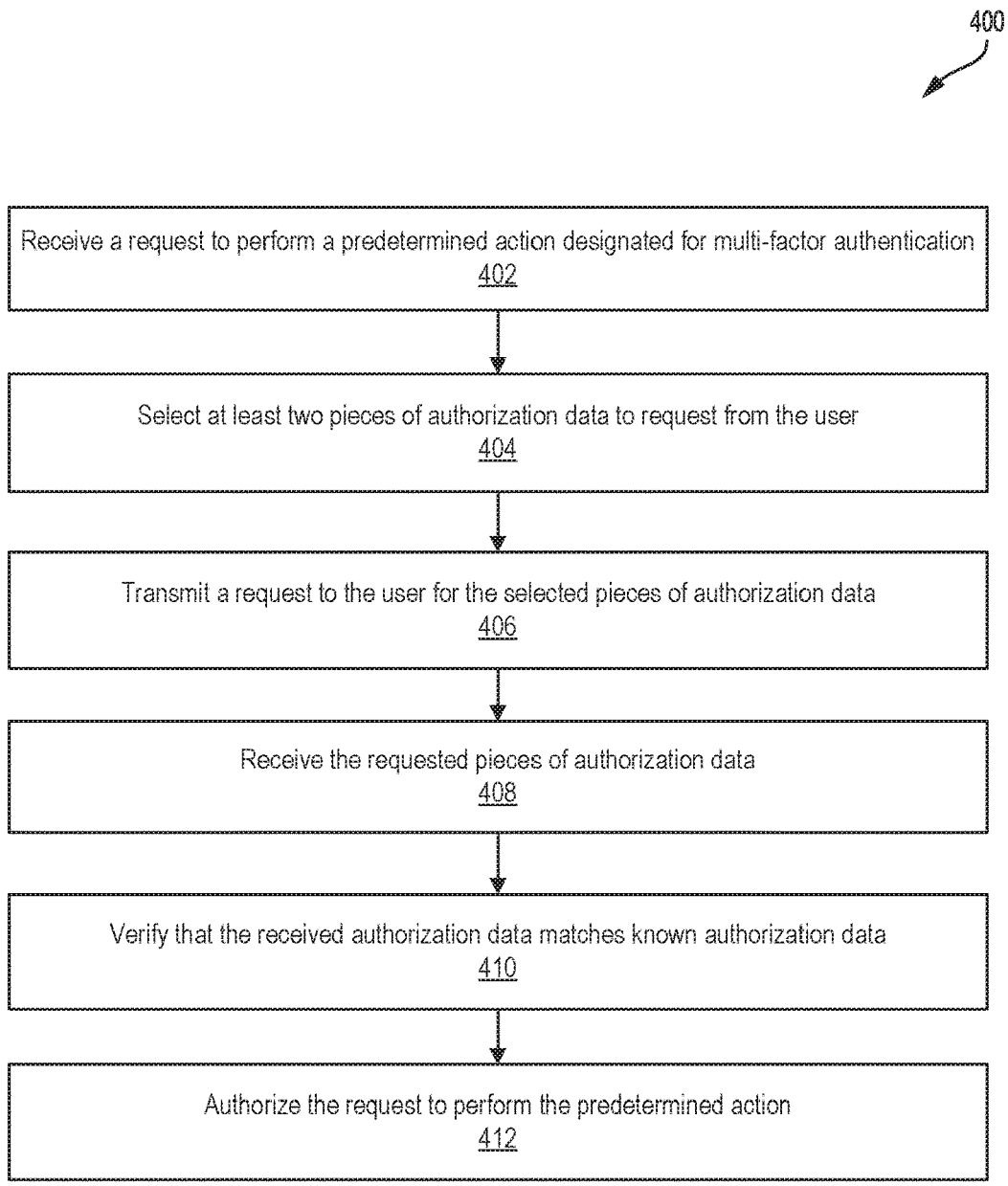
FIG. 4 is a flowchart showing a method of multi-factor verification, according to certain example embodiments.

FIG. 4 is a flowchart showing a method 400 of multi-factor verification, according to certain example embodiments. The method 400 may be embodied in computer readable instructions for execution by one or more processors such that the operations of the method 400 may be performed in part or in whole by the multi-factor authentication module 204; accordingly, the method 400 is described below by way of example with reference thereto. However, it shall be appreciated that at least some of the operations of the method 400 may be deployed on various other hardware configurations and the method 400 is not intended to be limited to the multi-factor authentication module 204.

At operation 402, the digital content delivery system 104 receives a request to perform a predetermined action designated for multi-factor authentication. This includes any set of selected actions such as accessing digital content, making changes to data included in the user's account, purchasing digital content items, renting digital content items, etc.

At operation 404, the data selection module 216 selects at least two pieces of authorization data to request from the user. This determination may be dynamic, meaning that different items of verification data may be requested based on the user account, as well as other contextual data, such as the time of day, verification data provided by the user during registration, geographic location of the user, etc.

In some embodiments, the data selection module 216 selects which authentication data to request from a user based on the authentication data that has been provided by the user. For instance, the data selection module 216 communicates with the user account database and determines which authentication data is available in the user's account and then selects two or more items of authentication data to request from the user. The data selection module 216 may select from the available authentication data at random, or based on other factors. For example, the data selection module 216 selects authentication data based on a predetermined priority order assigned to the authentication data. As a result, the data selection module 216 would select that pieces of authentication data that considered to be better indicators for verifying the identity of the user.

In another example, the data selection module 216 selects pieces of authentication data based on categorizations of the authentication data. In this type of embodiments, authentication data is categorized based on the type of data, and the data selection module 216 selects a piece of authentication data from at least two of the categories.

The data selection module 216 may also select pieces of authentication data based on the capabilities of the user's client device 108. For instance, if the user's client device 108 is equipped with a biometric sensor, the data selection module 216 selects that the user provide data captured by the biometric sensor, such as the user's fingerprint, retinal scan, etc. As another example, if the user's client device 108 is equipped with an optical sensor, such as a camera, the data selection module 216 requests that the user provide an image of the user captured by the optical sensor. As another example, if the user's client device 108 is equipped with a GPS component capable of determining the location of the user, the data selection module 216 requests that the user provide location data determined by the GPS component.

These are only examples of how the data selection module 216 may select pieces of authentication data, and they are not meant to be limiting. The data selection module 216 may use any of a variety of techniques to select pieces of authentication data, and this disclosure anticipates all such embodiments.

At operation 406, the data request module 218 transmits a request to the user for the selected pieces of authorization data. The data request module 218 transmits the request to the user's client device 108 for the authentication data selected by the data selection module 216.

The user then uses their client device 108 to provide the requested authentication data. Accordingly, at operation 408, the data request module 218 receives the requested pieces of authorization data. For example, the user uses a keypad to type in provided information and/or uses sensors and other input components on the device to provide the requested data, such as biometric sensors, camera, etc.

At operation 410, the data verification module 220 verifies that the received authorization data matches the known authorization data. For example, the data verification module 220 communicates with the user account database 112 to gather the verification data associated with the user's account. The data verification module 220 then determines whether the verification data provided by the user matches the verification data stored in the user account database 112. If the provided verification data matches the verification data in the user account database 112, the user is permitted to perform their requested action, such as access digital content. Accordingly, at operation 412, the data verification module 220 authorizes the request to perform the predetermined action. Alternatively, if the provided verification data does not match the verification data in the user account database 112, the user's request to perform the action is denied.

Figure 5:
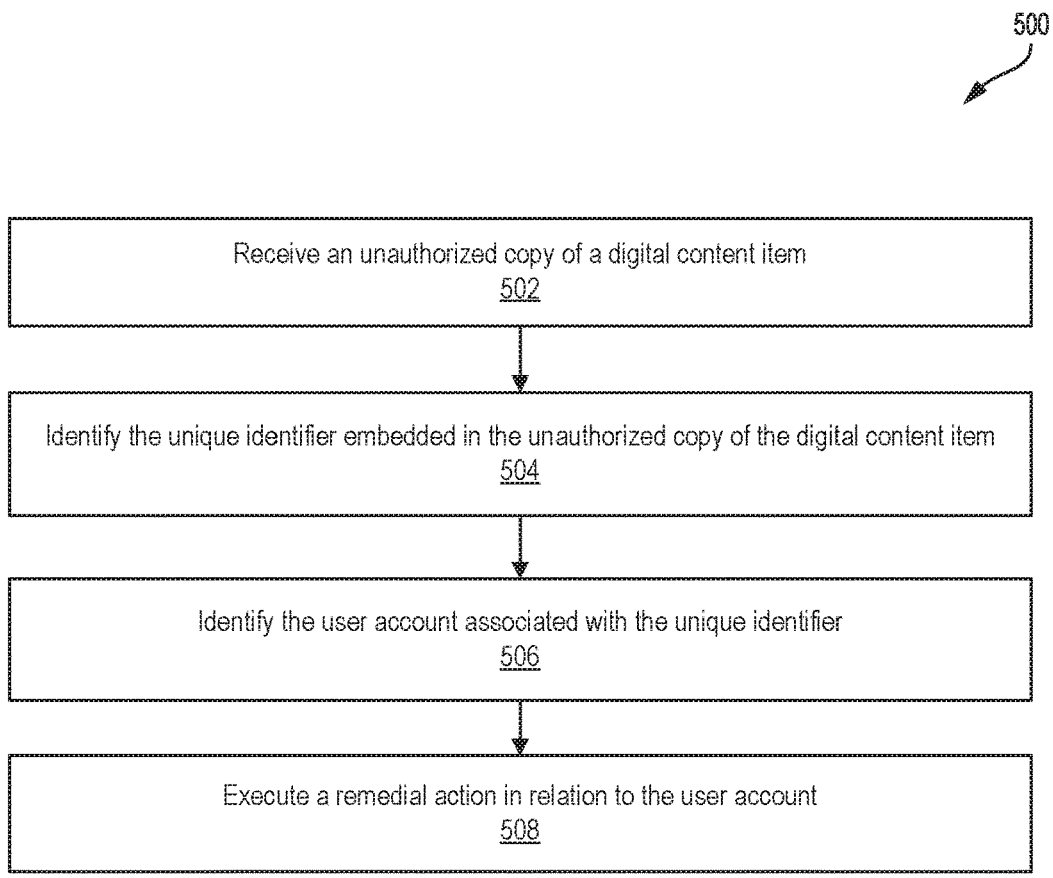
FIG. 5 is a flowchart showing a method of identifying the source of an unauthorized use of digital content and executing a remedial action, according to certain example embodiments.

FIG. 5 is a flowchart showing a method 500 of identifying the source of an unauthorized use of digital content and executing a remedial action, according to certain example embodiments. The method 300 may be embodied in computer readable instructions for execution by one or more processors such that the operations of the method 500 may be performed in part or in whole by the digital content misuse management application 120; accordingly, the method 500 is described below by way of example with reference thereto. However, it shall be appreciated that at least some of the operations of the method 500 may be deployed on various other hardware configurations and the method 500 is not intended to be limited to the digital content misuse management application 120.

At operation 502, the digital content delivery system 104 receives an unauthorized copy of a digital content item. For example, the unauthorized copy may be a pirated copy of a movie that was identified on the internet.

At operation 504, the digital content misuse management application 120 identifies the unique identifier embedded in the unauthorized copy of the digital content item. The unique identifier is embedded into the digital content item as part of a digital watermark when the digital content item is accessed from the digital content delivery system 104. The unique identifier embedded into the digital content item corresponds to the user account used to access the digital content item. Once embedded, the digital watermark remains in any copies that are subsequently made of the digital content item.

At operation 506, the digital content misuse management application 120 identifies the user account associated with the unique identifier. For example, the digital content misuse management application 120 searches the user account database 112 for the user account associated with the unique identifier.

At operation 508, the remedial action module 122 executes a remedial action in relation to the user account. For example, the remedial action module 122 suspends or terminates the user account. As a result, the user account can no longer be used to access digital content items maintained by the digital content delivery system 104.

Software Architecture

Figure 6:
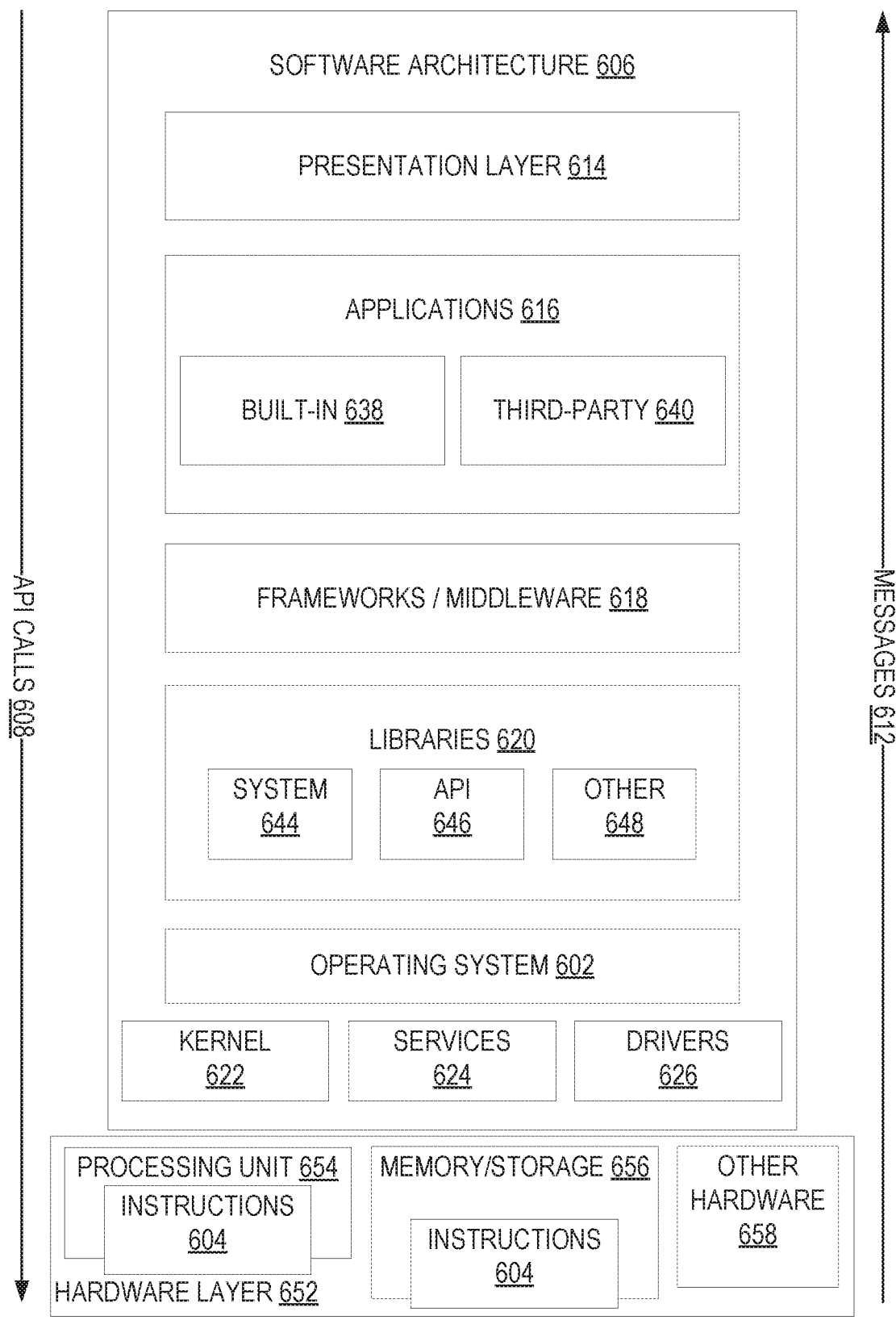
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and (input/output) UI/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response as in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
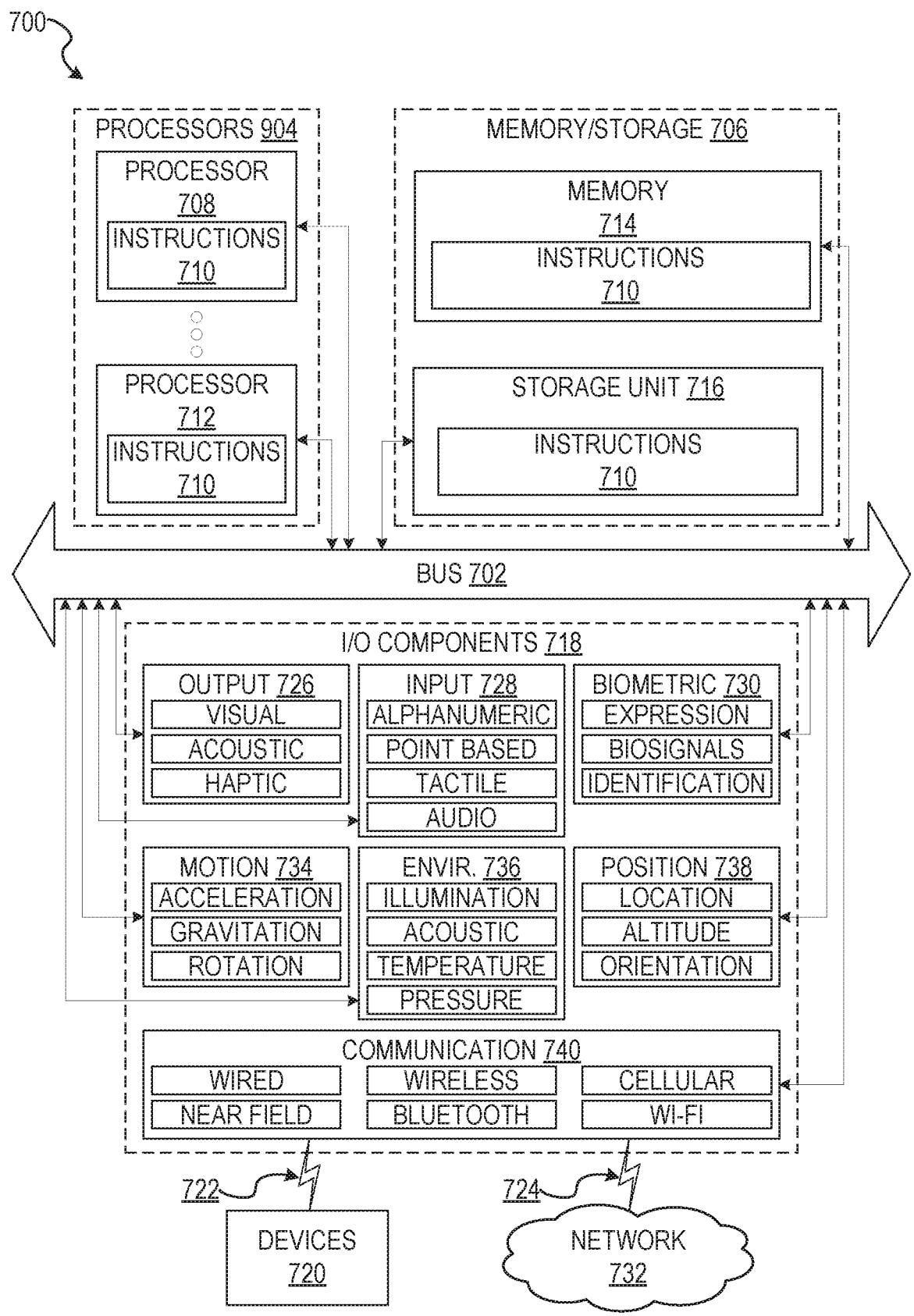
FIG. 7 is a block diagram illustrating components of a machine 700, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

What is claimed is:

1. A method comprising:
   transmitting, by a digital content delivery system and to a client device, a request for a set of verification data, the request transmitted as part of an account registrations process to verify that a user of the client device is providing accurate information regarding their identity;
   receiving, from the client device, a subset of the verification data, the subset of the verification data including at least a first item of verification data and a second item of verification data;
   determining a first predetermined value assigned to the first item of verification data;
   determining a second predetermined value assigned to the second item of verification data;

calculating an overall score based on at least the first predetermined value assigned to the first item of verification data and the second predetermined value assigned to the second item of verification data;

comparing the overall score to a threshold score, yielding a comparison;

in response to determining, based on the comparison, that the overall score meets or exceeds the threshold score, determining the user as having has provided accurate information regarding their identity;

in response to determining that the user has provided accurate information regarding their identify, generating a user account for the user, and generating a unique identifier for the user account, the user account enabling the user to access digital movies maintained by the digital content delivery system;

after generating the user account for the user, receiving a request from the client device to access a first digital movie maintained by the digital content delivery system;

selecting, based on the subset of the verification data provided by the user, at least two items of verification data needed to verify the user;

transmitting, to the client device, a request for the at least two items of verification data; and in response to receiving the at least two items of verification data from the client device, providing the first digital movie to a client-side digital content delivery system associated with the user, account generated for the user, the first digital movie being embedded with the unique identifier for the user account.

2. The method of claim 1, further comprising:

prior to receiving the subset of the verification data, receiving a previous subset of the verification data, the previous subset of the verification data being different than the subset of the verification data;

determining, based on the previous subset of the verification data, that additional verification data is needed from the user; and prompting the user to provide the additional verification data.

3. The method of claim 1, wherein the at least two items of verification data includes an image of the user captured by an optical sensor of the client device.

4. The method of claim 1, further comprising:

determining that an unauthorized version of a digital content item is embedded with the unique identifier for the user account; and deactivating the user account, wherein deactivating the user accounts prohibits the user account from accessing digital movies maintained by the digital content delivery system.

5. The method of claim 1, wherein the set of verification data includes one or more of date of birth, finger prints, eye color, height, weight, hair color, name, social security number, driver's license number, bank account information, credit card information, social network information, physical address, email address and phone number.

6. The method of claim 1, further comprising:

verifying authenticity of the subset of the verification data received from the client device.

7. The method of claim 1, further comprising:

determining, based on the subset of the verification data provided by the user, a set of geographic regions in which the user knows other users;

determining, based on monitoring the actions of the user, that the user has contacted at least one user in a geographic region that is not included in the set of geographic regions in which the user knows other users; and executing a remedial action.

8. A digital content delivery system comprising:

one or more computer processors; and one or more computer-readable mediums storing instructions that, when executed by the one or more computer processors, cause the digital content delivery system to perform operations comprising:

transmitting, to a client device, a request for a set of verification data, the request transmitted as part of an account registrations process to verify that a user of the client device is providing accurate information regarding their identity;

receiving, from the client device, a subset of the verification data, the subset of the verification data including at least a first item of verification data and a second item of verification data;

determining a first predetermined value assigned to the first item of verification data;

determining a second predetermined value assigned to the second item of verification data;

calculating an overall score based on at least the first predetermined value assigned to the first item of verification data and the second predetermined value assigned to the second item of verification data;

comparing the overall score to a threshold score, yielding a comparison;

in response to determining, based on the comparison, that the overall score meets or exceeds the threshold score, determining the user as having has provided accurate information regarding their identity;

in response to determining that the user has provided accurate information regarding their identify, generating a user account for the user, and generating a unique identifier for the user account, the user account enabling the user to access digital movies maintained by the digital content delivery system;

after generating the user account for the user, receiving a request from the client device to access a first digital movie maintained by the digital content delivery system;

selecting, based on the subset of the verification data provided by the user, at least two items of verification data needed to verify the user;

transmitting, to the client device, a request for the at east two items of verification data; and in response to receiving the at least two items of verification data from the client device, providing the first digital movie to a client-side digital content delivery system associated with the user, account generated for the user, the first digital movie being embedded with the unique identifier for the user account.

9. The digital content delivery system of claim 8, the operations further comprising:

prior to receiving the subset of the verification data, receiving a previous subset of the verification data, the previous subset of the verification data being different than the subset of the verification data;

determining, based on the previous subset of the verification data, that additional verification data is needed from the user; and prompting the user to provide the additional verification data.

10. The digital content delivery system of claim 8, wherein the at least two items of verification data includes an image of the user captured by an optical sensor of the client device.

11. The digital content delivery system of claim 8, the operations further comprising:
determining that an unauthorized version of a digital content item is embedded with the unique identifier for the user account; and
deactivating the user account, wherein deactivating the user accounts prohibits the user account from accessing digital movies maintained by the digital content delivery system.

12. The digital content delivery system of claim 8, wherein the set of verification data includes one or more of date of birth, finger prints, eye color, height, weight, hair color, name, social security number, driver's license number, bank account information, credit card information, social network information, physical address, email address and phone number.

13. The digital content delivery system of claim 8, the operations further comprising:
verifying authenticity of the subset of the verification data received from the client device.

14. The digital content delivery system of claim 8, the operations further comprising:
determining, based on the subset of the verification data provided by the user, a set of geographic regions in which the user knows other users;
determining, based on monitoring the actions of the user, that the user has contacted at least one user in a geographic region that is not included in the set of geographic regions in which the user knows other users; and
executing a remedial action.

15. A non-transitory computer-readable medium storing instructions that, when executed by one or more computer processors of a digital content delivery system, cause the digital content delivery system to perform operations comprising:
transmitting, to a client device, a request for a set of verification data, the request transmitted as part of an account registrations process to verify that a user of the client device is providing accurate information regarding their identity;
receiving, from the client device, a subset of the verification data, the subset of the verification data including at least a first item of verification data and a second item of verification data;
determining a first predetermined value assigned to the first item of verification data;
determining a second predetermined value assigned to the second item of verification data;
calculating an overall score based on at least the first predetermined value assigned to the first item of verification data and the second predetermined value assigned to the second item of verification data;
comparing the overall score to a threshold score, yielding a comparison;
in response to determining, based on the comparison, that the overall score meets or exceeds the threshold score, determining the user as having has provided accurate information regarding their identity;
in response to determining that the user has provided accurate information regarding their identify, generating a user account for the user, and generating a unique identifier for the user account, the user account enabling the user to access digital movies maintained by the digital content delivery system;
after generating the user account for the user, receiving a request from the client device to access a first digital movie maintained by the digital content delivery system;
selecting, based on the subset of the verification data provided by the user, at least of verification data needed to verify the user;
transmitting, to the client device, a request for the at least two items of verification data; and
in response to receiving the at least two items of verification data from the client device, providing the first digital movie to a client-side digital content delivery system associated with the user, account generated for the user, the first digital movie being embedded with the unique identifier for the user account.

16. The non-transitory computer-readable medium of claim 15, the operations further comprising:
prior to receiving the subset of the verification data, receiving a previous subset of the verification data, the previous subset of the verification data being different than the subset of the verification data;
determining, based on the previous subset of the verification data, that additional verification data is needed from the user; and
prompting the user to provide the additional verification data.

17. The non-transitory computer-readable medium of claim 15, wherein the at least two items of verification data includes an image of the user captured by an optical sensor of the client device.

18. The non-transitory computer-readable medium of claim 15, the operations further comprising:
determining that an unauthorized version of a digital content item is embedded with the unique identifier for the user account; and
deactivating the user account, wherein deactivating the user accounts prohibits the user account from accessing digital movies maintained by the digital content delivery system.

19. The non-transitory computer-readable medium of claim 15, wherein the set of verification data includes one or more of date of birth, finger prints, eye color, height, weight, hair color, name, social security number, driver's license number, bank account information, credit card information, social network information, physical address, email address and phone number.

20. The non-transitory computer-readable medium of claim 15, the operations further comprising:
verifying authenticity of the subset of the verification data received from the client device.

* * * * *